United States Patent [19]
Kleckner et al.

[11] Patent Number: 5,534,964
[45] Date of Patent: Jul. 9, 1996

[54] FILM LOADING PINS AND METHOD FOR EXTERNAL DRUM SCANNERS

[75] Inventors: Robert J. Kleckner, Yorktown Hgts., N.Y.; Sandra Graveson, Waterbury, Conn.

[73] Assignee: Xerox Corporation, Stamford, Conn.

[21] Appl. No.: 434,954

[22] Filed: May 4, 1995

[51] Int. Cl.⁶ .............................. G03D 13/14; G03G 5/00
[52] U.S. Cl. ........................ 354/344; 354/345; 355/213; 347/153
[58] Field of Search ................................ 354/341, 344, 354/345; 347/153, 154, 264; 355/211, 213

[56] References Cited

U.S. PATENT DOCUMENTS

| | | | |
|---|---|---|---|
| 920,263 | 5/1909 | Burton | 354/344 |
| 3,906,501 | 9/1975 | Kiess | 347/153 |
| 4,660,964 | 4/1987 | Yoshikawa et al. | 355/28 |
| 5,456,175 | 10/1995 | Haijima et al. | 101/170 |

FOREIGN PATENT DOCUMENTS 57-204534  12/1982  Japan .

*Primary Examiner*—Matthew S. Smith
*Assistant Examiner*—David A. Lane
*Attorney, Agent, or Firm*—Oliff & Berridge

[57] ABSTRACT

A registration pin for a rotating drum recorder device cooperates with a film to register and support the film during loading the film onto the drum. The registration pin has a reduced profile to reduce the overall size of the drum. The pin also has a construction to permit loading of different types of films onto the drum. The head of the registration pin is provided with a profile that supports and positions the film on the drum, even though the registration pin is shorter than conventional pins. The registration pin includes at least one protrusion to sandwich the film against the surface of the drum. The protrusion may take any appropriate form. The protrusion may include a "teardrop" shaped form, in order to positively hold the film on the drum.

18 Claims, 6 Drawing Sheets

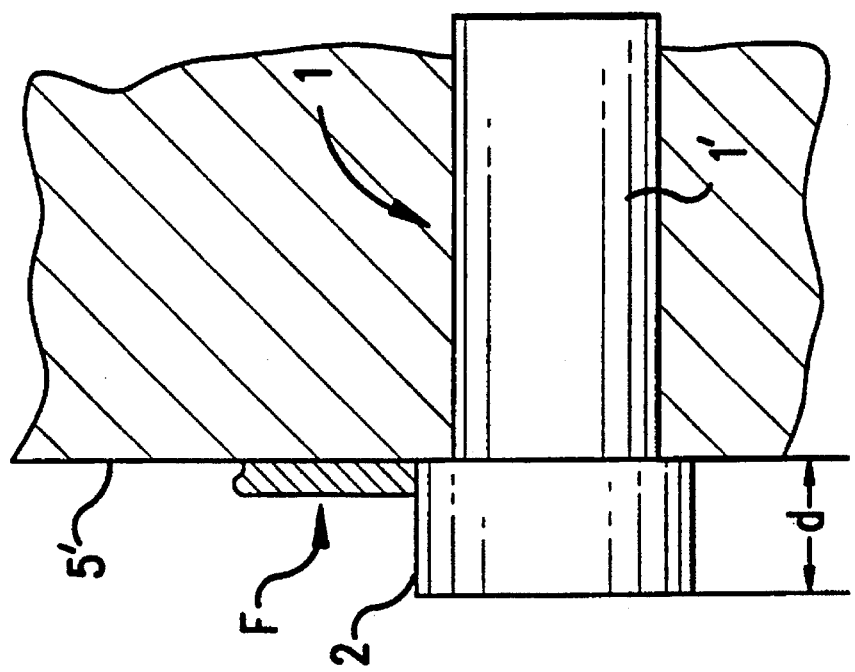
FIG.1A *PRIOR ART*
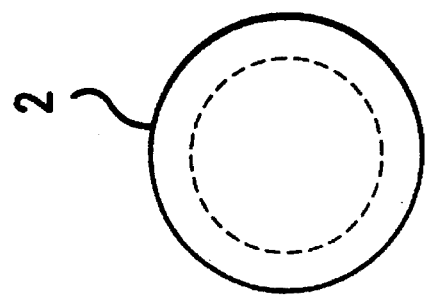
FIG.1B *PRIOR ART*

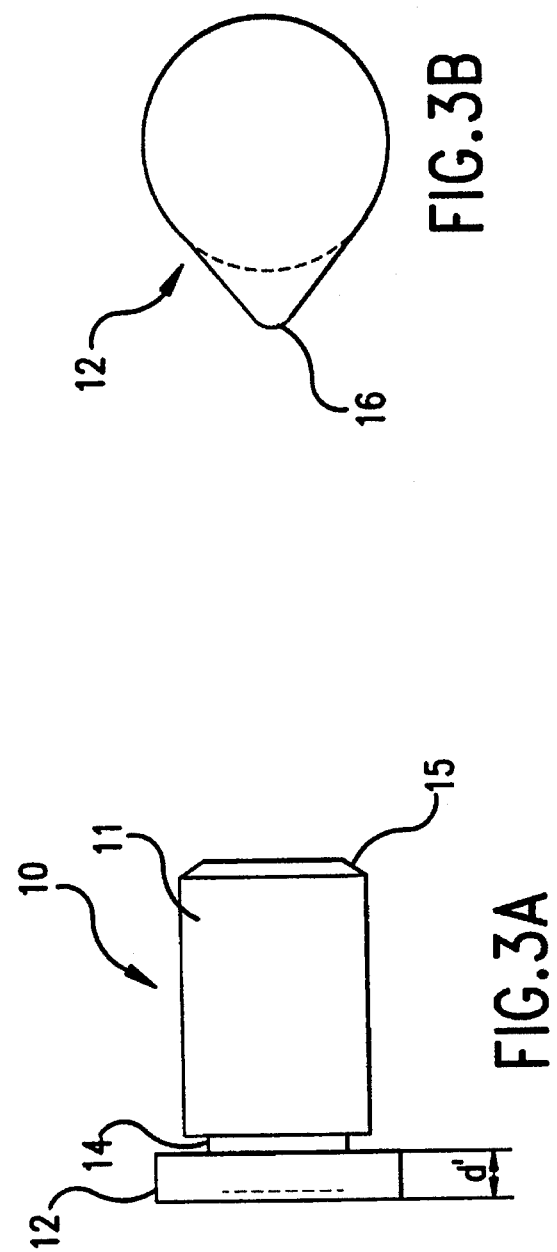

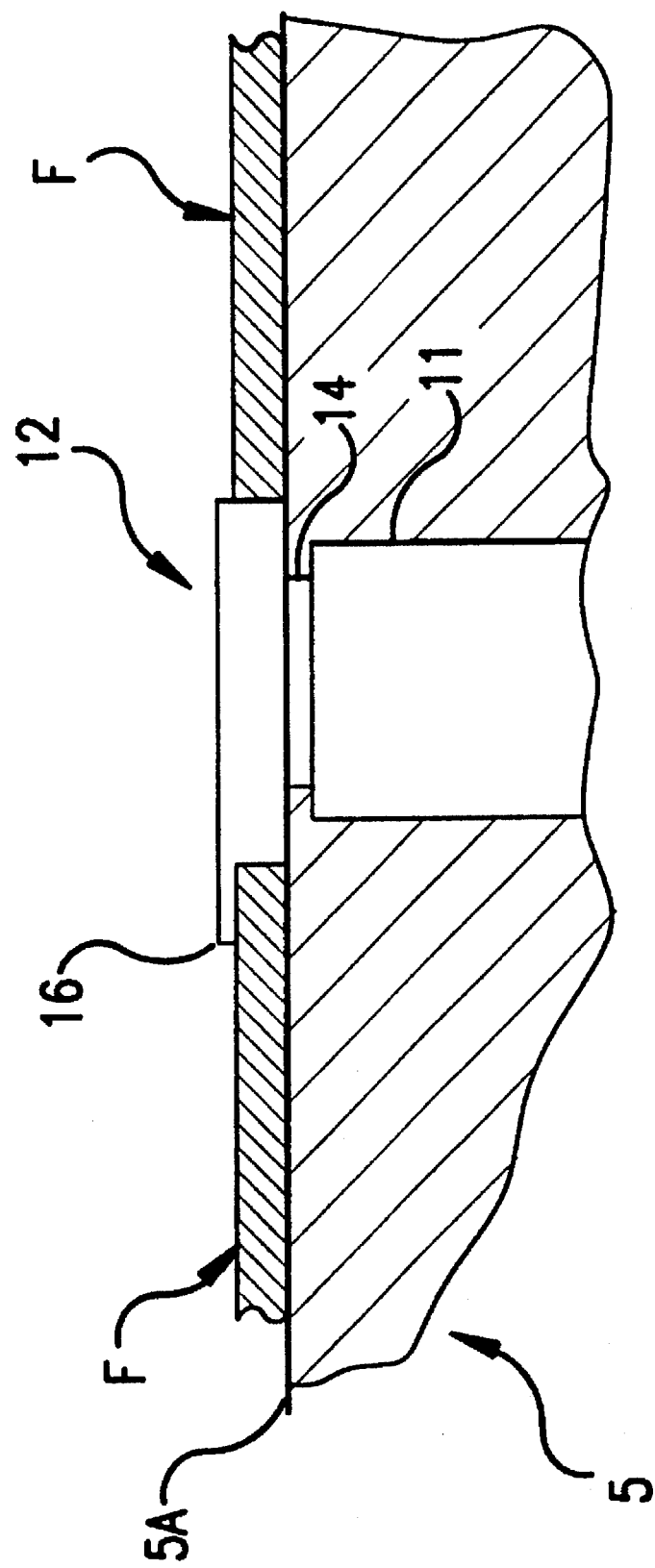

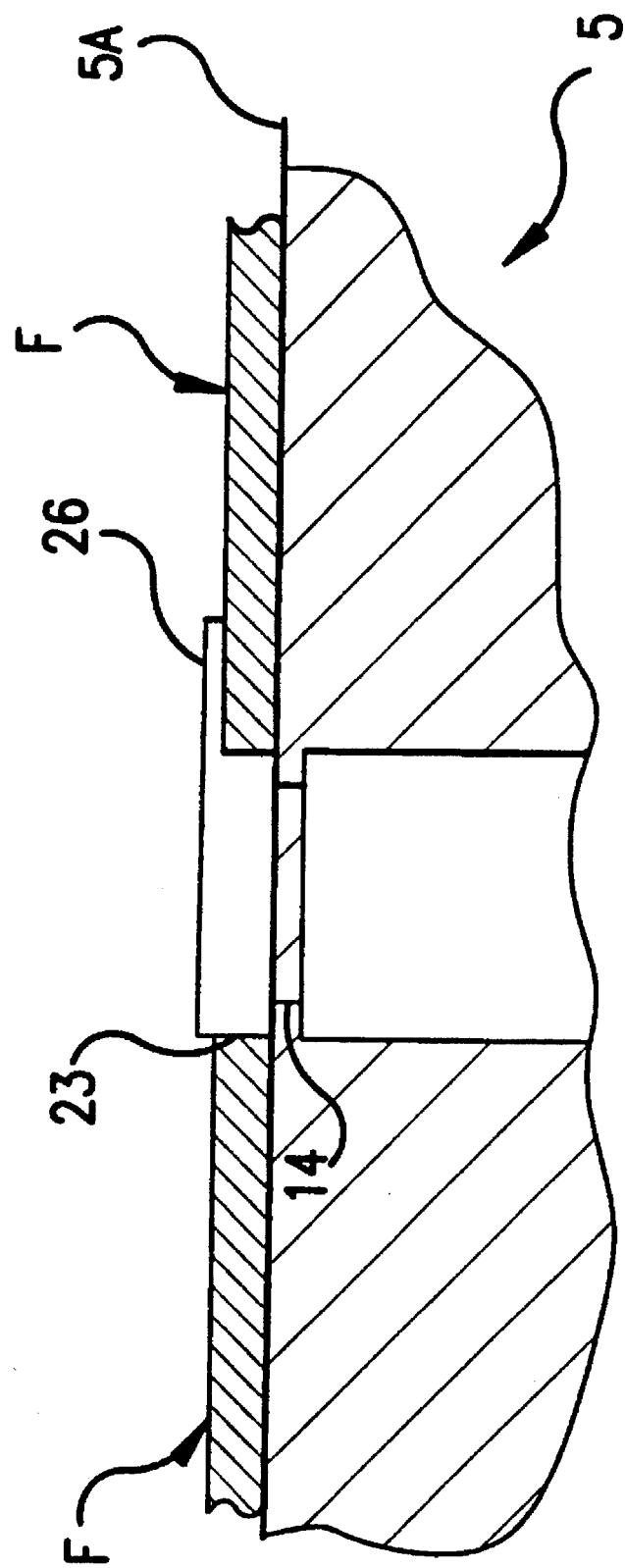

FILM LOADING PINS AND METHOD FOR EXTERNAL DRUM SCANNERS

BACKGROUND OF THE INVENTION

1. Field of the Invention

The present invention relates to a registration pin for a rotating drum used in a recorder device. The recording device may be an external drum recorder. The registration pin cooperates with a film to register and support the film during loading of the film onto the drum. The registration pin has a reduced profile to reduce the overall diameter of the drum. The pin also has a construction that accommodates loading of different types of films onto the drum.

2. Description of Related Art

Conventional registration pins support the film or sheet material on a rotating drum mainly through the, height of the pin above the surface of the drum. The pins, however, lack structure to retain and hold the film on the drum during rotation. In the conventional pins, holding and retention is achieved by placing at least one hole in a film and placing the at least one hole over a corresponding pin on a rotatable drum. Further, the operator of the device usually places some additional means to support and position the film at an edge of the film. This additional means may take the form of an adhesive tape or the like. Furthermore, the drum may also have structure, usually a vacuum, to hold the film against the drum during rotation.

Conventional registration pins have a head that extends a substantial height above the surface of the drum. In some applications, a charger or other ancillary device is required to be located close to the film and drum surface to permit the device to function satisfactorily. The height of the head in conventional registration pins is the main component of the pin that serves to hold the film in place. That is the film abuts against the head of the pin and if the film is subjected to any vertical movement, the film stays on the pin as long as the film can abut the head of the pin.

The pin having a substantial height may, however, interfere with an ancillary device. With a registration pin having a substantial height, the overall distance of the drum to the device must be increased, which is inconvenient and undesirable to achieve proper and clear images and to achieve a compact design of the overall apparatus.

With a pin having an enlarged head, a large gap from the drum surface to a charger is needed. This large gap is particularly ineffective with certain types of film chargers, especially using a digital film charger, such as a migration imaging film charger. In migration imaging film usage, the film is made sensitive to light by an electric charge. The film is developed through heat and does not require chemicals or water. This is advantageous as the migration imaging film is capable of safe and casual disposal.

The height of the conventional pin requires the external drum recorder in a migration imaging film charger to be placed a substantial distance from the drum's surface in order to clear the registration pins. Consequently, the migration imaging film chargers are ineffective when using conventional pins with enlarged heads, due to the required clearance distance.

FIGS. 1A and 1B show one type of conventional registration pin. Registration pin 1 is generally cylindrical and has body or shaft 1' and an enlarged head 2. The pin is introduced into the a hole in the drum in a well-known manner, including press-fit, adhesive or a threaded shaft.

The enlarged head 2 has an overall height dimension d in the order of about 0.120 inches. This overall head height dimension d does not permit an effective placement of a film charger near the drum surface.

FIGS. 2A and 2B show another form of a conventional registration pin 1A. Pin 1A includes an enlarged head 2A. The head 2A has flattened sections 3A, where a cord has been removed from the head. The cords have been removed from diametrically opposite sides of the head. While these flattened sections may assist in supporting and registering placement of the film onto the drum, pin 1A still has the disadvantageous enlarged head. The enlarged head 1A has an overall height d, about 0.120 inches from the surface of the drum.

The film has holes punched in an edge of the film. An operator places the film over the pins of the drum. Whereas, the height of the pins alone support and position the film on the drum, the operator usually places a tape or the like on the film edge with the holes to additionally support and position the film on the drum.

As can be seen from FIGS. 1A and 2A, the pins are mounted on a drum 5' of a recorder device. The heads 2 and 2A extend a distance d above the surface of the drum 5'. The overall height of each head 2 and 2A requires a film charger, especially a migration imaging film charger, to be placed a large distance from the drum surface 5'. This placement results in an ineffective operation of the recorder and lends to unsatisfactory recording results.

SUMMARY OF THE INVENTION

An object of the present invention is to provide a registration pin having a head with a reduced height for use in a recorder device. A registration pin with such a construction achieves an efficient operation with the associated charger because the charger can be located closer to the drum surface when compared with conventional registration pins. The registration pin has a head that extends a minimal distance above the surface of the drum. This reduces the distance from the drum surface to the charger and permits quality recording.

The registration pin according to the invention can be used with conventional films without modification of the recording devices. Further, the decreased height of the head of the registration pin permits the drum surface to be closer to the charger or other ancillary device, which results in an efficient overall operation of the recorder.

Another object of the invention is to provide a registration pin that adequately holds the film on the drum, as the drum rotates, without the need for additional means to support and position the film, such as tape. The head of the registration pin is provided with a profile that supports and holds the film on the drum, even though the registration pin is shorter than the conventional pins. The profile of the registration pin includes at least one protrusion. The at least one protrusion may take any appropriate form that corresponds to the holes punched in a film to be mounted on the drum. The at least one protrusion may include a "teardrop" shaped form, in order to positively hold the film on the drum. Further shapes of the protrusion, such as a star, ellipse, oval and the like, may be employed, in order to properly align with the holes of the film.

BRIEF DESCRIPTION OF THE DRAWINGS

The invention will be described in conjunction with the accompanying drawings in which like reference numerals designate like elements and wherein:

FIGS. 1A and 1B show a conventional registration pin;

FIG. 3A is a side view of a registration pin according to a first embodiment of the present invention;

FIG. 3B is a top view of the registration pin according to the first embodiment of the invention;

FIG. 3C is a sectional view of the head of the pin according to the first embodiment of the invention;

FIG. 5 is a sectional view of the head of the pin according to the first embodiment of the invention positioning a film having an aperture;

FIG. 6 is a sectional view of the head of the pin according to the second first embodiment of the invention positioning a film having an aperture.

DETAILED DESCRIPTION OF PREFERRED EMBODIMENTS

Figure 2A:
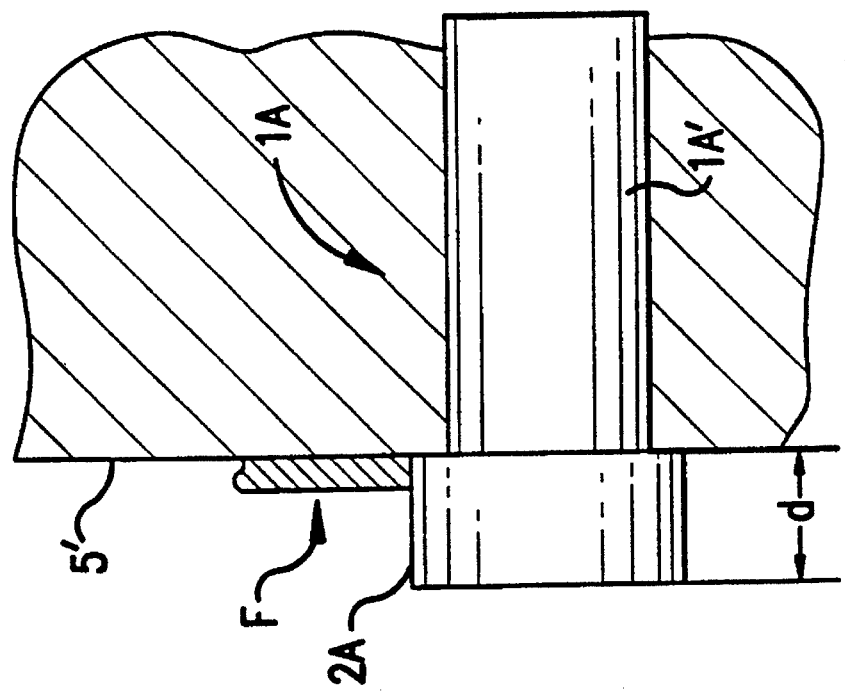
FIGS. 2A and 2B show another form of a conventional registration pin.
Figure 2B:
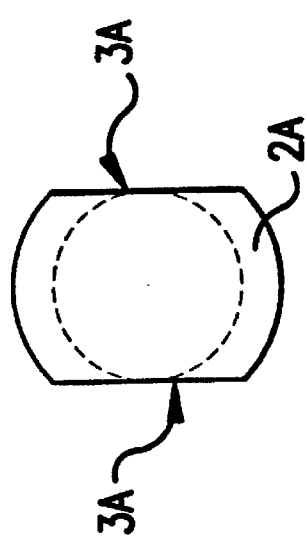

A registration pin according to a first preferred embodiment is shown in FIG. 3A. FIG. 3A is a side view of a registration pin 10. Registration pin 10 includes a body 11 and a head 12. The pin can be made from any suitable material, including but not limited to stainless steel with a black nickel plating, aluminum, plastic or other suitable material.

The body 11 is separated from the head 12 by reduced region 14. The reduced region 14 facilitates the accurate manufacture of the pin 10. Without the reduced region 14, it would be difficult and expensive to manufacture the pin 10 with the step for the head 12. Further, the reduced region 14 permits the pin to be fully inserted into a hole (not labeled) in the drum, as explained hereinafter. The end of the body remote from the head includes a beveled surface 15. The beveled surface 15 facilitates the positioning of the pin 10 in the hole of the drum 5.

The reduced height head 12 of the pin 10 includes at least one protrusion 16, as illustrated in FIGS. 3B and 3C. Although any number of protrusions could be provided, the single protrusion 16 of FIGS. 3B and 3C is shown only as an example. As can be seen in FIG. 3C, the head 12 is generally circular, with the exception of the protrusion 16. The height of the head 12 is preferably about 0.045 inches, while the thickness of the protrusion is about 0.017 inches.

Protrusion 16 preferably extends from the head 12 in a radial direction in a "teardrop" shape; although the invention is not meant to be limited. The protrusion may extend in any appropriate direction to cooperate with the hole in the film F and may take any appropriate form, especially corresponding to the shape of the holes punched in the edge of the film F to positively hold and position the film F on the surface 5A of the drum 5.

When a film F is loaded, the protrusion 16 overlaps a portion of the film F, sandwiching the film F between the protrusion 16 and the surface 5A of the drum 5. Thus, the film F is positively retained on the drum 5 by the registration pin 10, without the need for tape or the like. The gap between the protrusion 16 and the surface of the drum 5A is substantially greater than or equal to the thickness of film F. Further, as is seen from FIGS. 3A–3C, the head 12 of the pin 10 has a reduced height d' about 0.045 inches. Therefore, the gap or distance from the drum 5 to any ancillary device (not shown) can be reduced.

In addition, the protrusion 16 permits the overall height d' of the head 12 to be reduced, without losing support and positioning of the film F. The conventional registration pin relies solely on the head's height alone to support and position a film, while the protrusion 16 of the pin 10 positively holds and maintains the film F on the surface 5A of the drum 5.

Figure 4A:
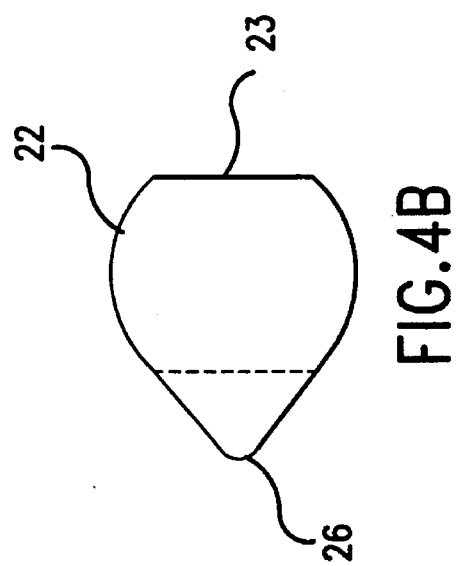
FIG. 4A is a side view of a registration pin according to a second embodiment of the present invention.
Figure 4B:
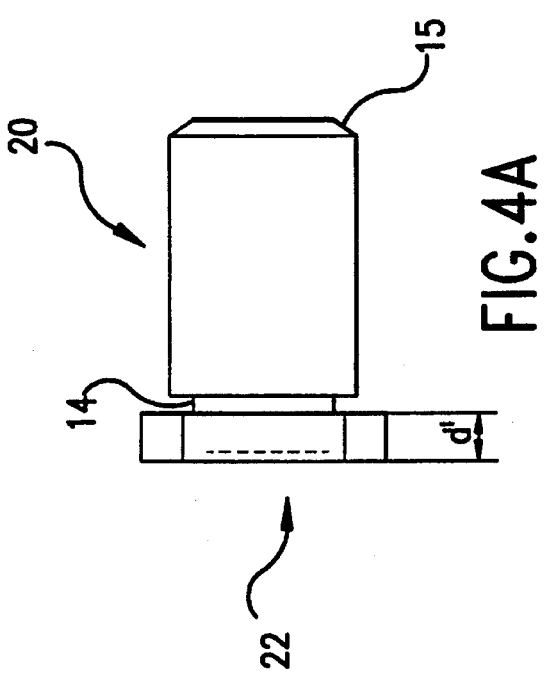
FIG. 4B is a top view of the registration pin according to the second embodiment of the invention.
Figure 4C:
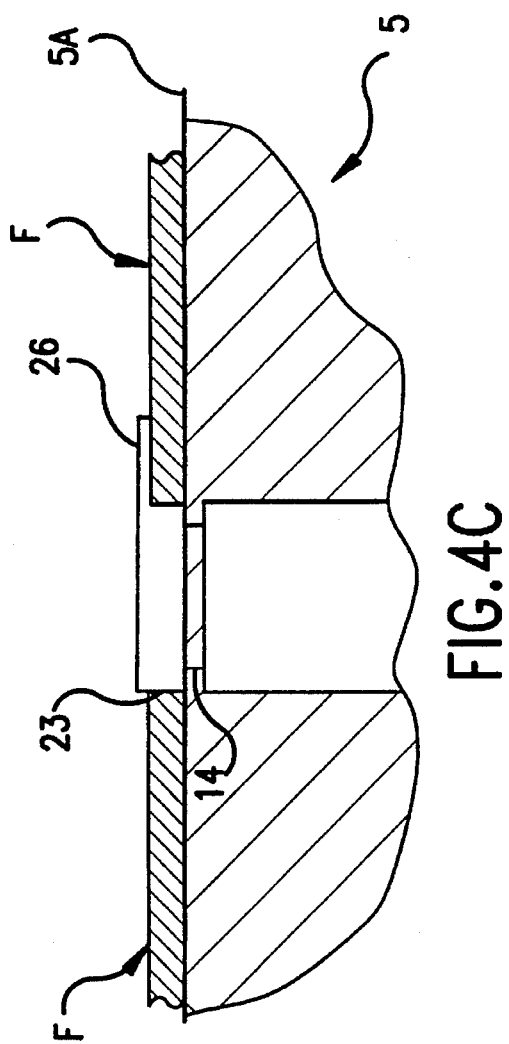
FIG. 4C is a sectional view of the head of the pin according to the second embodiment of the invention.

FIGS. 4A, 4B and 4C show a registration pin according to a second preferred embodiment of the invention. The registration pin 20 is substantially similar to the registration pin 10 shown in FIGS. 3A–3C, and therefore, a description of similar elements is omitted. As seen in FIGS. 4B and 4C, the head 22 of the registration pin 20 includes at least a protrusion 26, in a similar fashion and nature of protrusion 16. The head 22 includes flattened sections 23 in the head 22. The sections 23 assist in the registration and support of the film on the registration pin 20.

The operation of a recorder provided with at least one registration pin 10 will now be described. The operation with pin 20 is equivalent. The drum 5 has a series of holes (not labeled) into which at least one registration pin 10 may be placed. The reduced portion 14 permits the pin to be placed within a hole so that the bottom surface of the head is in contact with the surface 5A of the drum 5. If the reduced portion is not provided, there is a possibility that the step between the shaft and the head would not be square and a flush fitting of the pin to the surface 5A of the drum may not be possible.

The head of the pin may take any appropriate form corresponding to the holes punched in the film F. The holes punched in the film F are arranged to ensure a proper and accurate placement of the film F on the drum 5. The drum 5 may have any number of registration pins, in various shapes, mounted thereon to accept different types of films. Further, the configurations of the pins may also vary to accept films F with different hole arrangements.

The drum 5 is rotated and a hole of film F is moved into a cooperative relationship with the pin 10. If the film F moves into cooperative abutting contact with the pin 10 having a head 12 with a protrusion 16, the film F is sandwiched between the protrusion 16 and the surface 5A of the drum 5, as seen in FIG. 3C. Thus, the film is positively held in place, even though the pin maintains a reduced profile on the drum.

FIG. 5 illustrates a configuration where the film F has apertures and is mounted over pin 12. The protrusion 16 holds and maintains the film F on pins 20 of the drum 5. The present registration pins 10 with the head 12 provide additional support and positioning of the film F.

FIG. 6 illustrates a configuration where the film F has apertures and is mounted over pin 22. The protrusion 26 and the flattened section 23 hold and maintain the film F on pins 10 of the drum 5. The present registration pins 20 with the head 22 provide additional support and positioning of the film F.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A registration pin for accurately positioning and holding a film on a rotating drum, the pin comprising:

a body; and a head, wherein the head has a predetermined height and at least one protrusion, the at least one protrusion having at least one substantially constant thickness overlapping portion that overlaps a portion of the film and sandwiches the film between the at least one protrusion and the rotatable drum.

2. A pin according to claim 1, wherein the head has a section that substantially matches a mating hole in the film protrusion.

3. A pin according to claim 1, further comprising a reduced diameter area between the head and the body.

4. A pin according to claim 1, wherein the pin is made from a stainless steel.

5. A pin according to claim 1, wherein the pin is made from aluminum.

6. A pin according to claim 1, wherein the pin is made from plastic.

7. A pin according to claim 1, wherein the at least one protrusion has a cross-section generally in the shape of a teardrop.

8. A pin according to claim 1, wherein the head extends above the rotatable drum to a height of about 0.045".

9. A method of registering a film on a surface of a rotatable drum, the drum including a registration pin comprising a body and a head, wherein the head has a predetermined height and at least one protrusion having at least one substantially constant thickness overlapping portion that overlays a portion of the film, the method comprising:

placing the film onto the rotatable drum so that a portion of the film is under the at least one protrusion; and holding and positioning the film between the at least one protrusion and the rotatable drum during rotation of the drum.

10. A method according to claim 9, wherein the film has at least one aperture, the method further comprising the step of placing the at least one aperture over the head so that a portion of the film is under the at least one protrusion, thereby holding and positioning the film between the at least one protrusion and the rotatable drum during rotation of the drum.

11. A method according to claim 9, wherein the at least one protrusion has a cross-section generally in the shape of a teardrop.

12. An apparatus for positively and accurately positioning and holding a film on a rotatable drum, the apparatus comprising:

a body;

a head, wherein the head has a predetermined height; and means for sandwiching the film against the rotatable drum, the means for sandwiching having a substantially constant thickness, and comprising at least one substantially constant thickness overlapping means for overlapping a portion of the film.

13. An apparatus according to claim 12, wherein the sandwiching means comprises at least one protrusion adapted for overlapping a portion of the film.

14. An apparatus according to claim 13, wherein the at least one protrusion has a cross-section generally in the shape of a teardrop.

15. An apparatus according to claim 12, further comprising a reduced diameter area between the head and the body.

16. An apparatus according to claim 12, wherein the apparatus is made from a stainless steel.

17. An apparatus according to claim 12, wherein the apparatus is made from aluminum.

18. An apparatus according to claim 12, wherein the apparatus is made from plastic.

* * * * *